3,589,931
STRUCTURES FORMED OF GLASS FIBER-
ELASTOMER SYSTEMS
Alfred Marzocchi, Cumberland, and Nicholas S. Janetos,
Providence, R.I., assignors to Owens-Corning Fiberglas
Corporation
Continuation of application Ser. No. 714,297, Mar. 19,
1968, which is a division of application Ser. No.
470,407, July 8, 1965, now Patent No. 3,387,900, which
in turn is a division of application Ser. No. 750,253,
July 22, 1958. This application Sept. 30, 1969, Ser.
No. 863,037
Int. Cl. C03c 25/02; B32b 17/04
U.S. Cl. 117—72     3 Claims

ABSTRACT OF THE DISCLOSURE

A cured elastomeric product reinforced with glass fibers embedded within the cured elastomeric material and in which the bonded relationship between the glass fiber reinforcement and the elastomeric material is enhanced by a coating applied to the glass fiber surfaces prior to the combination with the elastomeric material in which the coating consists of an organic compound that forms a weak basic solution in water and reacts with the glass fiber surfaces to introduce a positive charge and has a nitrogen group in the form of an amino group and which may include in combination therewith an amino silane or unsaturated silane.

---

This application is a continuation of our copending application 714,297, Mar. 19, 1968, now abandoned, which was a division of our then copending application Ser. No. 470,407, filed July 8, 1965, and entitled "Structures Formed of Glass Fiber-Elastomer System" now Pat. 3,387,900, which was a division of our then copending application Ser. No. 750,253, filed July 22, 1958, and entitled "Structures Formed of Glass Fiber-Elastomer Systems," now abandoned.

This invention relates to structures formed of glass fibers in combinations with elastomer materials and it relates more particularly to glass fibers which are treated on their surfaces with compounds that enhance the integration of the glass fibers with the elastomer component to enable fuller utilization to be made of the desirable properties of the glass fibers which are used in the combinations with natural and synthetic rubbers in the manufacture of improved vulcanized, cured, foamed, molded, or coated products, such as coated reinforcing strands and yarns of glass fibers, conveyor belts, tires, hose and the like elastomer materials which are reinforced with glass fibers.

It is an object of this invention to produce a coated, cured or vulcanized elastomer product having improved tear, tensile and/or flexure strength, improved dimensional stability, improved retention of strength at elevated temperatures, and particularly improved resistance to crack growth in use and it is a related object to produce new and improved elements for use in the manufacture of same.

Figure 1:
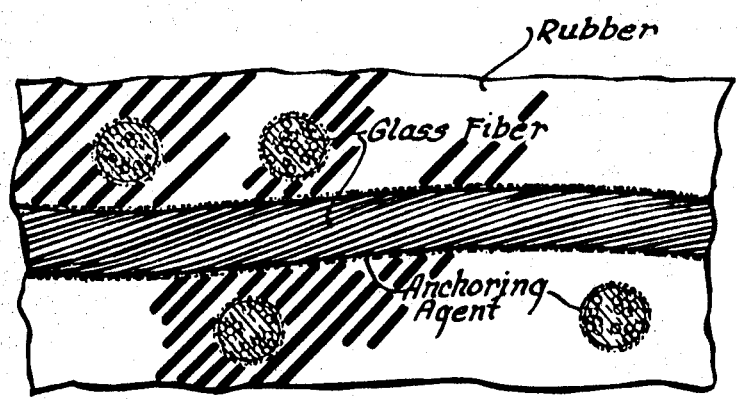
Figure 2:
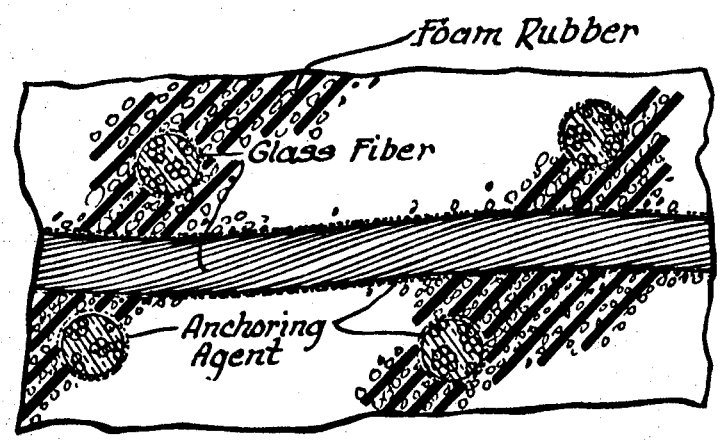

These and other objects and advantages of this invention will hereinafter appear and for purposes of illustration, but not of limitation, an embodiment of the invention is shown in the accompanying drawing in which:

FIG. 1 is an enlarged elevational view in cross-section of a molded product fabricated in accordance with the practice of this invention, and FIG. 2 is an enlarged elevational view in cross-section of a foamed elastomeric product embodying the features of this invention.

This invention is addressed chiefly to cured or vulcanized rubbers of natural and synthetic origin and to means for improving the characteristics of products formed of such coated, cured or vulcanized elastomers by the combination which makes use of glass fibers to impart dimensional stability at room and at elevated temperatures, to provide strength and strength retention at elevated temperatures, and to provide other physical and other mechanical properties to the composite structure. The invention is addressed also to the fabrication of fibers, yarns and strands coated with an elastomeric material in the manufacture of various glass fiber structures and for use of the coated glass fibers as a reinforcement and strengthening agent for elastomer materials whereby the fibers are tied in through the coating to form an integral component of the composite structure.

To the present, glass fibers which have been added or otherwise incorporated with elastomer materials have tended to function more as a filler than as a reinforcement, flexibilizing or stabilizing agent with the result that little, if any, improvements in mechanical and physical properties have been made available from the combination of glass fibers in products formed of such elastomer materials. It is believed that the failure to make fuller utilization of some of the more desirable properties of the glass fiber component resides in the inability to integrate the glass fibers into the elastomer system. As a result, the glass fibers function more as a filler than as a contributing factor in the properties of the cured, vulcanized or other elastomer product.

Somewhat similar difficulties have been experienced in the utilization of glass fibers and fabrics formed thereof for reinforcements in systems formed of synthetic resinous materials in the manufacture of reinforced plastics and laminates. The difficulties with the resinous systems arose from the inability to achieve a strong and permanent bond between the resinous materials and the glass fiber surfaces. The deficiency with respect to the bonding relationship between the glass fiber surfaces and the resinous materials was believed to be caused by the inability to achieve physical anchorage of the resinous material to the perfectly smooth surfaces of the non-porous glass fibers, and to be caused by the inability to achieve a chemical bond between the resinous component and the hydrophilic surfaces of the glass fibers which were more highly receptive to moisture than the organic resinous material, so that any bonding relationship capable of being achieved in the dry state would be further weakened upon displacement of the resinous material by a water film at high humidities.

The resinous system has been improved by the treatment of the glass fibers, in advance of their combination with the resinous materials, to modify the glass fiber surfaces by the application of a material which is capable of preferential anchorage to the glass fibers and which embodies groups capable of condensation reaction with groupings available in condensation polymerizable resins, or which contain other groups capable of orientation or reaction with groupings available in the resinous material to provide a receptive surface for the resin.

The experience which has been gained from the work addressed to the improvement of the glass fiber-resin system has indicated an approach which might be taken to overcome some of the difficulties encountered in the combination of glass fibers with elastomers as represented by the curable or vulcanizable rubbers, notwithstanding the fact that the cured or vulcanized rubbers are understood to be substantially unlike and not equivalent to the resinous materials, at least from the standpoint of construction, composition, reaction, and manner of cure or vulcanization. It will be appreciated that the vulcanization reactions of the elastomers are unrelated to the condensation reactions or the addition reactions comprising the mechanism for the vulcanization of resinous materials so that the same general concepts will not directly apply. It is believed, however, that the surfaces of the glass fibers are capable of modification so as to derive better integration between the surfaces of the glass fibers and the cured or vulcanized elastomers in the manufacture of the various elastomeric products.

After considerable experimentation, both with materials and in formulations, it was found that certain treatments could be employed with glass fibers which would enable fuller utilization to be made of the many desirable properties of the glass fibers in the combination with the elastomeric materials in the form of coatings, or foamed or molded vulcanized or cured products. Some of the major improvements capable of being achieved reside in the retardation of crack growths and the improvement in one or more of the properties of hardness, tear strength, tensile strength, flexure strength, and modulus. In the case of strands or yarns for use in combination with elastomers in the manufacture of belting, tires, hose, and other molded products, some of the important further improvements include dimensional stability at variable temperatures and strength retention even at high temperature.

As the elastomeric component, this invention includes the use of natural rubbers or rubbers formed synthetically of butadiene, chloroprene, isoprene and the like, or copolymers of butadiene, chloroprene, isoprene with other materials well known in the manufacture of synthetic rubbers and especially the vulcanizable and curable modifications of the foregoing.

As the glass fiber component, use can be made of staple glass fibers and yarns and woven and non-woven fabrics formed thereof. Use can be made of continuous fibers and strands, yarns and fabrics formed thereof. It is preferred to make use of the glass fiber component in the form of fibers, strands or yarns which have been cut or chopped to lengths greater than ⅛ inch but less than 5 inches, and preferably, to lengths within the range of ¼–2 inches. When the glass fibers are embodied in the elastomeric component, while the latter is in a flowable or plastic state, uniform and substantially complete distribution of the glass fiber component can be achieved when present in amounts up to 15 percent by weight of the elastomer. The desired results are secured when the glass fiber component is present in an amount greater than 1 percent by weight, and best results are secured with a glass fiber concentration within the range of 3–10 percent by weight of the elastomer.

The concepts of this invention are embodied in two relatively different types of reactions to achieve the desired integration or orientation between the glass fiber component and the elastomer. While the mechanics differ basically, it will be understood that one may embody some of the concepts of the other more or less by way of a supplement, and it will be understood that some of the compounds employed in the practice of this invention will be capable of supplying the combination of the two concepts to effect better integration between the glass fiber component and the elastomer material.

In one concept, use is made of a treating material which is intended to alter the charge on the glass fiber surfaces from a negative charge to a positive charge which enables reactions similar to those experienced with rubber hardeners to enable a fuller and more complete tie-in to be achieved between the glass fiber surfaces and the vulcanizable or curable elastomer material. In the other concept, the surfaces of the glass fibers are treated with a material which is capable of strong anchorage to the glass fiber surfaces and which embodies components or groupings which enable cross-linking with sulphur during the vulcanization step to tie in the glass fiber surfaces with the elastomer materials.

In the former system, the treating composition is formulated to embody an organic compound containing an amino, imino, amido, or imido compound, alone or in combination with coupling agents. As the organic nitrogen compound, use can be made of polyamines, acylamides, polyamides and the like compounds which form weakly basic solutions in water and which react on the glass fiber surfaces to provide a positive charge which enables reaction similar to rubber hardeners in the elastomeric system whereby the modified glass fiber surfaces become more fully integrated into the elastomeric system. When present, the coupling agent should be selected of an organo silane formed with an aliphatic group having ethylenic or acetylenic unsaturation, as represented by the formula $R_nSiX_{4-n}$ in which $n$ is a number between 1 and 3, R is an organic group such as an aliphatic, aromatic, or mixed aliphatic-aromatic group in which at least one of the R groups contains an unsaturated aliphatic group, and in which X is a highly hydrolyzable group such as chlorine, bromine, or other halogen, or a short-chain alkoxy group such as methoxy, ethoxy or the like. Representative of suitable coupling agents are vinyltrichlorosilane, allyltrichlorinesilane, vinyltriethoxysilane, allyltrimethoxysilane and the like.

The following are representative of the weakly basic organic nitrogen compounds which may be employed in the described concept for the treatment of the glass fiber surfaces to make them more receptive to the elastomer materials:

Polyvinylpyridine
A polyamine having the formula

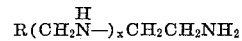

wherein R is a monovalent organic group and X is a whole number
Polyacrylonitriles
Amine alcohols
Hexamethylene diamine
Co-condensation products of the isocyanates with amide
Diphenyl guanidine
Cyclic tertiary amines having the formula

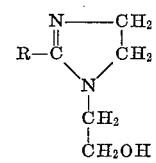

in which R is a mixture of pentadecyl and heptadecyl
Ammonium resinoleate

The following are treating compositions which are representative of the system described:

EXAMPLE 1

| | Percent by Weight | |
|---|---|---|
| | Preferred | Range |
| Polyvinylpyridine | 1.0 | 0.3–5.0 |
| Butyraldehyde, condensation reaction product (Accelerator 808) | 0.4 | 0.1–0.5 |
| Toluene | 1.0 | 0.5–2.0 |
| Alkphenoxy polyoxyethylene ethanol (an alkylaryl polyether alcohol) (Triton X100) | 0.05 | 0.5–0.2 |

NOTE.—Remainder water.

EXAMPLE 2

1.0 percent by weight polyamine having the formula

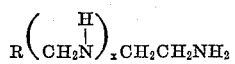

0.5 percent by weight tri(β-methoxyethoxy) vinyl silane (A–172)
0.4 percent by weight diphenyl guanidine
1.0 percent by weight toluene
0.1 percent by weight Triton X100
Remainder water

EXAMPLE 3

1.5 percent by weight hexamethylene diamine
0.5 percent by weight butyraldehyde-monobutylamine condensation product
1.0 percent by weight toluene
0.1 percent by weight wetting agent (Triton X100)
Remainder water

EXAMPLE 4

2.0 percent by weight vinylpyridine
0.4 percent by weight allyl triethoxysilane
1.0 percent by weight toluene
0.1 percent by weight wetting agent
Remainder water

EXAMPLE 5

1.0 percent by weight 1(2-hydroxyethyl)-2-n-alkyl-2-imidazoline
1.0 percent by weight allyl trichlorosiliane
1.0 percent by weight toluene
0.1 percent by weight wetting agent
Remainder water The treating compositions may be applied to the glass fibers in forming by a spray process, by a dip coat process or by means of a roller coater or wiping pad to wet the surfaces of the fibers with the treating material. Instead, the fibers or strands which are formed thereof may be treated subsequent to fiber formation but preferably after the size originally applied has been removed from the surfaces of the fibers as by heat treatment or by washing.

In the practice of this invention, it will be sufficient if an amount of treating composition is applied to form a monomolecular layer on the glass fiber surfaces. More may be applied, but it is undesirable to provide the glass fiber surfaces with a thick coating of the treating material. In practice, use can be made of a treating composition containing 0.3–5.0 percent by weight of the organic nitrogen compound. When a silane, its hydrolysis product or its polymerization product is employed as an anchoring agent, the anchoring agent may also be present in the treating composition in an amount within the range of 0.3–5.0 percent by weight. It is more desirable to make use of the anchoring agent in the ratio of 1 part by weight of the agent to 0.5–2.0 parts by weight of the organic nitrogen compound.

In the other system, use is made of an organo-silicon compound capable of strong attachment to the glass fiber surfaces through the silicon oxide linkages and which contains ethylenic or acetylenic unsaturation to permit sulphur cross-linkages between the unsaturated group of the organo-silicon compound and the unsaturated groups of the uncured elastomer. For this purpose, it is desirable to make use of the organo-silicon compound in the combination with sulphur accelerators, or in the combination with sulphur or benzoyl peroxide or other strong oxidizing agent.

As the unsaturated organo-silicon compound, it is desirable to make use of a compound of the type previously described, represented by the formula $R_nSiX_{4-n}$, wherein n is a whole number between 1 and 3 and in which at least one of the R groups is an unsaturated aliphatic group, such as allyl, vinyl and the like, and in which X is a highly hydrolyzable methoxy, ethoxy or the like.

As the sulphur accelerator, use is made of one or more of the compounds identified as tetraethylthiuram dioxide (Thiuram E), tetramethylthiuram disulfide (Thiuram M), dipentamethylthiuram tetrasulfide (Tetron A), tetramethylthiuram tetrasulfide (Tetron).

The following are given by way of typical formulations of glass fiber treating compositions embodying the further concept of this invention:

EXAMPLE 6

0.5 percent by weight tri(β-methoxyethoxy) vinyl silane
0.25 percent by weight Thiuram E
1.0 percent by weight toluene
Remainder water

EXAMPLE 7

1.0 percent by weight gamma-aminopropyl vinyldiethoxysilane
0.3 percent by weight Thiuram M
1.0 percent by weight toluene
Remainder water

EXAMPLE 8

0.75 percent by weight gamma (triethoxysilane propyloxy) propylamine
0.25 percent by weight Tetron
1.0 percent by weight toluene
Remainder water Application for treatment of the glass fibers may be achieved in the same manner as in Examples 1–5.

The treating composition can be applied in amounts to provide a monomolecular film on the glass fiber surfaces, but it is preferred to provide for a greater amount of the material on the glass fiber surfaces, but less than 2 percent by weight of the glass fibers. In application, the material can be formulated into a treating composition containing 0.1–5 percent by weight of the organo-silicon compound. The sulphur or sulphur accelerator can be employed in an amount ranging from 2–20 percent by weight of the organo-silicon component.

The two systems can advantageously be embodied into a single system wherein use is made of an organo-silicon compound formulated to contain an amino, imino, amido or imido group whereby attachment to the glass fiber surfaces can be achieved through the silane and the nitrogenous group can also operate to modify the charge on the glass fiber surfaces whereby the surfaces of the glass fibers are made highly receptive to the elastomer materials. For this purpose, use can also be made of carboxyl derivatives of the silanes, as represented by delta carboxypropyltriethoxysilane or any of its homologs, or use can be made of carboxylic esters of the silanes as represented by the compound

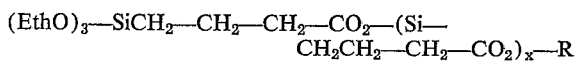

which would be hydrolyzed in water to the corresponding carboxyl group. The aminosilane can be employed in the treating composition in an amount ranging from 0.1–5.0 percent by weight and it can be employed alone but preferably in combination with other materials such as the accelerators previously described or in combination with a polyhydric alcohol and polymers thereof as will be illustrated by the following examples:

EXAMPLE 9

0.4 percent by weight gamma-aminopropyltriethoxysilane
0.2–1.0 percent by weight N'N'dimethylacrylamide
Remainder water

EXAMPLE 10

0.3 percent by weight gamma-aminopropyltriethoxysilane
0.5–2.5 percent by weight Gentac (vinyl pyridineresorcinol formaldehyde latex)
0.1 percent by weight wetting agent
Remainder water

EXAMPLE 11

0.3–0.6 percent by weight gamma-aminopropyltriethoxysilane
0.2–0.5 percent by weight butyraldehyde-aniline condensation product
0.05–0.2 percent by weight Triton X100
0.02–0.4 percent by weight silica sol (Ludox)
0.3–1.0 percent by weight toluene
Remainder water

EXAMPLE 12

0.3–1.0 percent by weight gamma-aminopropyltriethoxysilane
0.5–1.0 percent by weight butyraldehyde-aniline condensation product
0.5–1.0 percent by weight toluene
0.05–0.2 percent by weight Triton X100
0.5–2.0 percent by weight Gentac
Remainder water Applications of the treating composition can be achieved by spray coating, roller coating or wiping the treating material onto the glass fibers during formation or by application onto the glass fibers and strands or yarns formed thereof after the original size has been removed from the glass fiber surfaces.

Somewhat along the line of the first system described, the glass fibers can be treated with a suitable anchoring agent and thereafter milled for dispersion of the surface modified glass fibers in the elastomeric material to tie in the dispersed glass fibers with the elastomer in forming a composite product. This concept can be further illustrated by the following:

EXAMPLE 13

1–5 percent by weight of a cyclic tertiary amine having the formula $$R-C\overset{N}{\underset{\underset{\underset{CH_2OH}{CH_2}}{N}}{\overset{\|}{\diagdown}}}\overset{CH_2}{\underset{CH_2}{\diagup}}$$

(Nalco amine GH) wherein R is a mixture of pentadecyl and heptadecyl
Remainder water

EXAMPLE 14

1–5 percent by weight ammonium resinoleate
Remainder water

EXAMPLE 15

0.2–5.0 percent by weight gamma-aminopropyltriethoxysilane
Remainder water

EXAMPLE 16

0.3–2.0 percent by weight quaternary ammonium chloride (Nalquat)
Remainder water

EXAMPLE 17

0.2–2.0 percent by weight 1(2-hydroxyethyl)-2-N-alkyl-2-imidazoline
Remainder water The Nalco amine and the Nalquat and other cationic amine surface active agents are highly absorbed on the glass fiber surfaces to form a film. They function on the glass fiber surfaces as a wetting agent and as a lubricating agent thereby to improve the dispersion of the milled fibers in the rubber or other elastomer. Similar effects are derived from the amino silanes and from the ammonium resinoleate.

In the foregoing, where the compositions are used to treat the glass fiber surfaces to render the surfaces receptive to elastomer materials as described in Examples 1–17, or to enhance the wetting out characteristics or dispersibility of the fibers in such rubber or elastomer systems, it is sufficient if the fibers are coated to provide a monomolecular layer of the treating material. Desirable results are secured when the treating material on the glass fiber surfaces represents up to 2 percent by weight of the glass fibers. While more can be used, the results secured by such additional amounts are not compensated by the additional cost of the material.

While we have described three separate concepts effective to improve the characteristics developed in the combination of glass fibers and elastomers whereby fuller utilization can be derived from the glass fiber component, it will be apparent that the systems are not individually exclusive one from the other but that they may be combined in various combinations to give the improved results. Thus, the accelerators can also find beneficial use when employed in combination with the nitrogenous compounds for effecting a change in the charge characteristics on the glass fiber surfaces. Also, use can be made of the silanes with or without such accelerators when the silanes are formed with nitrogenous groups to contribute the effect of the change in charge on the glass fiber surfaces and to enable entrance into the vulcanization reaction.

It will be apparent that we have provided a new and novel means which is now effective to achieve fuller utilization of many of the desirable properties of glass fibers when employed in combinations with elastomeric materials whereby the composite product can not only be improved in its strength and resiliency but wherein the final product will have greater dimensional stability at low and at high temperature and will be able to retain its strength characteristics when employed under high temperature conditions. It will be evident that other beneficial improvements will be secured as the result of the close tie-in between the glass fibers and the elastomeric materials in the manufacture of various products including coated fibers and strands to be employed in the combination with elastomers in the construction of belting, hose, or tires and in the combination of glass fibers with elastomeric materials in the manufacture of foamed or molded products by vulcanization or cure.

It will be understood that changes may be made in the details of the formulation of the various treating compositions and in their manner of application as well as in the combinations made between the glass fibers and elastomer materials, without departing from the spirit of the invention, especially as defined in the following claims.

We claim:
1. A glass fiber reinforced elastomeric product comprising a continuous phase of a cured elastomeric material, glass fibers embedded as a fibrous phase within the cured elastomeric material for reinforcement and a coating on the glass fiber surfaces prior to the combination with the elastomeric material strongly to bond the cured elastomeric material to the glass fiber surfaces wherein the coating consists essentially of an organic compound which forms a weak basic solution in water and reacts with the glass fiber surfaces to introduce a positive charge and wherein the organic compound has a nitrogen containing group in the form of an amino group and an organo-silicon compound formed of an amino silane.

2. A glass fiber reinforced elastomeric product as claimed in claim 1 in which the materials are present in the coating on the glass fibers in the ratio of 1 part by weight of the amino silicon compound to 0.5 to 2 parts by weight of the organic nitrogen compound.

3. In the method of producing a cured elastomeric product reinforced with glass fibers, the steps of treating the glass fibers to coat the glass fibers with a composition.

the solids of which consist essentially of an amino silane and an organic nitrogen compound in which the nitrogen is present in the form of an amino group and in which the organic nitrogen compound forms a weak basic solution in water and reacts with the glass fiber surfaces to introduce a positive charge, drying the coating on the glass fiber surfaces, combining the coated glass fibers with an uncured elastomeric material to distribute the coated glass fibers within the elastomeric material, and curing the elastomeric material under heat and pressure whereby the elastomeric material is advanced to a cured stage and becomes strongly attached to the glass fiber surfaces through the coating.

References Cited

UNITED STATES PATENTS

| | | |
|---|---|---|
| 2,468,086 | 3/1949 | Latham et al. |
| 2,762,717 | 9/1956 | Clark. |
| 2,763,573 | 9/1956 | Biefeld. |
| 2,799,598 | 7/1957 | Biefeld et al. |

WILLIAM D. MARTIN, Primary Examiner

D. COHEN, Assistant Examiner

U.S. Cl. X.R.

117—126